United States Patent [19]
Lakin

[11] Patent Number: 5,803,357
[45] Date of Patent: Sep. 8, 1998

[54] THERMOSTAT WITH REMOTE TEMPERATURE SENSORS AND INCORPORATING A MEASURED TEMPERATURE FEATURE FOR AVERAGING AMBIENT TEMPERATURES AT SELECTED SENSORS

[75] Inventor: Brian Lakin, Elgin, Ill.

[73] Assignee: Coleman Safety and Security Products, Inc., Downers Grove, Ill.

[21] Appl. No.: 801,346

[22] Filed: Feb. 19, 1997

[51] Int. Cl.[6] .............................. G05D 15/00; G01K 3/00
[52] U.S. Cl. ......................................... 236/78 B; 374/115
[58] Field of Search ........................... 236/78 B; 374/115

[56] References Cited

U.S. PATENT DOCUMENTS

| | | | |
|---|---|---|---|
| 2,691,889 | 10/1954 | Dion et al. | 236/78 B X |
| 4,206,872 | 6/1980 | Levine | 236/46 R |
| 4,292,404 | 9/1981 | Kasahara | 435/18 |
| 4,300,199 | 11/1981 | Yokins et al. | 364/557 |
| 4,335,847 | 6/1982 | Levine | 364/505 X |
| 4,355,760 | 10/1982 | Ruby | 236/78 B X |
| 4,469,274 | 9/1984 | Levine | 340/309.15 X |
| 4,506,826 | 3/1985 | Kammerer et al. | 236/46 R |
| 4,522,333 | 6/1985 | Blau, Jr. et al. | 236/20 R |
| 4,531,064 | 7/1985 | Levine | 307/66 |
| 4,682,648 | 7/1987 | Fried | 236/51 X |
| 4,718,599 | 1/1988 | Brown | 236/46 R |
| 4,967,382 | 10/1990 | Hall | 364/551 |
| 4,997,029 | 3/1991 | Otsuka et al. | 236/51 X |
| 5,025,984 | 6/1991 | Bird et al. | 236/46 R |
| 5,056,712 | 10/1991 | Enck | 236/20 R |
| 5,070,431 | 12/1991 | Kitazawa et al. | 362/31 |
| 5,103,391 | 4/1992 | Barrett | 364/133 |
| 5,181,653 | 1/1993 | Foster et al. | 236/49.3 |
| 5,244,148 | 9/1993 | Vandermeyer | 236/46 R |
| 5,361,982 | 11/1994 | Liebl et al. | 236/51 X |
| 5,361,983 | 11/1994 | Bird | 236/46 R |
| 5,566,879 | 10/1996 | Longtin | 165/205 X |
| 5,611,484 | 3/1997 | Uhrich | 236/46 R |

*Primary Examiner*—William E. Wayner
*Attorney, Agent, or Firm*—James H. Phillips; Squire, Sanders & Dempsey

[57] ABSTRACT

A thermostat includes a first temperature sensor integral with the thermostat and at least one and typically three remotely positioned temperature sensors. Switches are provided to select which one or more temperature sensors are employed to provide an averaged measured temperature. Voltages representative of the temperature ambient to each diversely placed sensor are applied to separate inputs to an analog multiplexer which transfers a single voltage to an analog-to-digital converter in accordance with address codes received from a processor. The output of the A-D converter, a digital count representative of the temperature measured by the currently selected sensor, is read by the processor and temporarily saved. Then, the next selected sensor is similarly processed. When all the selected sensors have been processed, the resulting counts are averaged, and the result is conventionally processed, as by passing it through a conversion algorithm, to obtain the averaged temperature which is employed as the measured temperature and compared against a current reference temperature to determine control signals to be sent to one or more environmental modification units such as a heater and/or an air conditioner.

4 Claims, 3 Drawing Sheets

10 5,803,357

THERMOSTAT WITH REMOTE TEMPERATURE SENSORS AND INCORPORATING A MEASURED TEMPERATURE FEATURE FOR AVERAGING AMBIENT TEMPERATURES AT SELECTED SENSORS

FIELD OF THE INVENTION

The present invention relates generally to an environmental control system. More particularly, this invention relates to a thermostat for controlling heating and/or cooling systems which incorporates a local temperature sensor, at least one remote temperature sensor and circuitry for averaging the temperatures sensed by one or more selected temperature sensors.

BACKGROUND OF THE INVENTION

Environmental control systems for maintaining the temperatures within a building generally consist of a control unit or thermostat which incorporates an integral temperature sensor and controls one or more temperature modifying units such as a furnace or air conditioner. The thermostat is programmed with a reference temperature at which a building, or a defined space within a building, is to be maintained and senses, employing the temperature sensor, when the measured temperature in the area of the thermostat either drops below or raises above the current reference temperature. The thermostat then initiates either heating or cooling to restore the ambient temperature to the reference temperature.

There are numerous types of thermostats which generally fall into either the programmable or nonprogrammable category. A programmable thermostat typically includes a processor which processes sensed conditions in accordance with preset criteria and issues appropriate commands to a heating and/or cooling unit. A control panel on the thermostat enables a user to enter data into the processor (i.e., to program the thermostat) so as to maintain the controlled space at different temperatures during different time periods. A nonprogrammable thermostat typically has only a single reference temperature which a user manually sets or adjusts.

Whether programmable or non-programmable, a thermostat typically includes: 1) controls for selecting a current reference temperature, 2) a temperature sensor for measuring the measured temperature, 3) a device for comparing the measured temperature to the reference temperature, 4) a medium for activating a temperature modifying unit, such as a heating and/or cooling unit when the measured temperature deviates a predetermined amount from the reference temperature and 5) a medium for deactivating the temperature modifying unit when the measured temperature rises (in the case of heating) or drops (in the case of cooling) to within a predetermined amount from the reference temperature.

Thermostats usually incorporate a hysteresis value and/or an anticipator value, each of which is typically in the range of 1° F. to 2° F. The hysteresis value establishes the predetermined amount the measured temperature can deviate from the reference temperature before a temperature modifying unit is activated.

Thus, when making a decision to activate a temperature modifying unit, heating will not be activated unless the measured temperature drops below the reference temperature minus the hysteresis value. Similarly, cooling will not be activated unless the measured temperature rises above the reference temperature plus the hysteresis value.

The anticipator value is used by the thermostat in deciding when a temperature modifying unit should be deactivated. Heating is deactivated when the measured temperature is equal to the reference temperature minus the anticipator value. Cooling is deactivated when the measured temperature equals the reference temperature plus the anticipator value. The anticipator value is thus a safeguard against substantially overshooting the reference temperature. It is chosen so that residual heat or cold with the system will bring the ambient temperature within the conditioned space in the area of the temperature sensor to about the reference temperature after the temperature modifying unit is deactivated, but with the circulating air blower continuing to run for a short period to extract the residual generated heat or cold.

A general discussion of thermostat control, including the functions of hysteresis and anticipator values, is included in U.S. Pat. No. 4,967,382 to Hall, the disclosure of which is incorporated herein by reference.

Most environmental control systems do not offer remote temperature sensing capability. They simply include a single temperature sensor contained within the thermostat housing. A limitation of this arrangement is that the thermostat monitors the temperature only at the location at which it is mounted, and buildings (or defined spaces within a building) typically have relatively wide temperature variances from floor to floor or room to room. For example, the upper floors are typically warmer than the lower floors. Further, because of the locations of windows, doors and heating and cooling vents, as well as other factors, the temperature often varies noticeably between individual rooms within the controlled space. Therefore, a single temperature sensor leads to the problem of hot spots or cold spots being present within the controlled spaces in areas in more use than the area where the thermostat is situated. Accordingly, it is well known that the most convenient position in a conditioned environment to place a thermostat may not be the best place to situate the sensor.

Some environmental control systems optionally include remote sensors, but to connect the remote sensor(s), the sensor in the thermostat housing must usually be disconnected, typically by clipping a jumper on the circuit board of the thermostat. Therefore, this type of thermostat can still only monitor the temperature in one area; there is no provision for averaging the temperatures measured by a plurality of diversely placed sensors. Furthermore, connecting the remote sensor is a difficult, time consuming task which is not suited to the average home owner.

It is also known to provide a system including a thermostat that allows for the temperatures measured by remote temperature sensors to be averaged, but with significant limitations. First, the sensor within the thermostat must be removed from the circuit before the remote sensors can be connected. Second, for the temperature to be averaged, the remote sensors must be connected in a particular manner so as to create a series/parallel network having a resistance at a given temperature equal to that of the disconnected sensor within the thermostat housing. Consequently, there is no provision for selecting and averaging only specific sensors or specific groups of sensors to provide best overall performance in a given environment.

It is also known to provide an environmental control system including a thermostat that can regulate the temperatures in different zones, enabling the temperature to vary independently, according to a different reference temperature entered for each zone. Such systems typically have, in each zone to be monitored: 1) a temperature sensing device and 2) either a temperature modifying unit, such as a furnace or air conditioner, or a device to control the flow of hot or cold air, such as a damper control. These systems do not enable users to control the temperature within a building or defined space according to an average of measured temperatures or to select one or more temperature sensors to be monitored and averaged for the purpose of controlling the temperature within the entire building or defined space.

Examples of prior art devices including remote temperature sensing capabilities are U.S. Pat. Nos.: 4,967,382 to Hall 5,556,879 to Loingtin; 5,361,982 to Lieffl et al; 5,181,653 to Foster et al; 5,103,391 to Barrett; and 4,294,404 to Gajjar.

Because of the temperature variations within a building, a homeowner or building user may wish to control the temperature of the building, or a defined space, about an averaged temperature value, wherein the average is calculated based upon the measured temperatures in the most frequently used or most important rooms. The prior art fails to provide a simple, inexpensive and accurate way to monitor the average temperature within a building or to monitor the average temperature within selected areas of a building and to control a central temperature modifying unit according to this average temperature.

OBJECTS OF THE INVENTION

It is therefore a broad object of this invention to provide an improved thermostat for controlling one or more temperature modifying units for a defined space.

It is a more specific object of this invention to provide such an improved thermostat that has the capability of averaging, in any selectable combination, ambient temperatures sensed at the thermostat and at one or more remote positions.

SUMMARY OF THE INVENTION

Briefly, these and other objects of the invention are achieved by a thermostat which includes a first temperature sensor integral with the thermostat and at least one remotely positioned temperature sensor. In one presently preferred embodiment, three remote temperature sensors, distributed in three diverse locations away from the thermostat, are employed, and switches are provided to select which one or more temperature sensors are read to provide an averaged measured temperature. In the exemplary presently preferred embodiment, thermistors are used as the temperature sensors, and each sensor is connected in series between a reference voltage and a voltage dividing resistor. Thus, the voltage appearing at the junction between the sensor and the resistor is representative of the temperature ambient to the sensor. The voltages are applied to separate inputs to an analog multiplexer which transfers a single voltage to an analog-to-digital converter in accordance with address codes received from a processor. The output of the A-D converter, a digital count representative of the temperature measured by the currently selected sensor, is read by the processor and temporarily saved. Then, the next selected sensor is similarly processed. When all the selected sensors have been processed, the resulting counts are averaged, and the result is conventionally processed, as by passing it through a conversion algorithm, to obtain the averaged temperature which is employed as the measured temperature and compared against a current reference temperature to determine control signals to be sent to one or more environmental modification units such as a heater and/or an air conditioner.

DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE PREFERRED EMBODIMENT

Attention is first directed to FIG. I which illustrates a first configuration for an exemplary environment in which the invention may be practiced and demonstrating the advantages which it provides. A programmable thermostat 10 serves to conventionally control temperature modifying unit(s) 14 (heating and/or air conditioning units) in accordance with the current program and in keeping with current sensed conditions in the managed space as well known in the art. Thermostat 10 incorporates an integral temperature sensor 12 (shown in a broken away region of the thermostat) which senses an ambient temperature of 71° F. in the immediate area of the thermostat. The system also includes three remote temperature sensors 16, 18, 20 which are placed in different areas, typically different rooms, in the space to be temperature controlled.

In the example, thermostat 10 is a modified seven day programmable thermostat that has heating, cooling, automatic and manual modes. The thermostat can be conventionally programmed in the heating and cooling modes. The program schedule includes a heating program and a cooling program, wherein each program uses the same selectable time settings, but can have different reference temperature settings for the various time periods.

Each individual day may be programmed to individually suit a user's requirements. The thermostat can have up to four temperature setpoint time periods for each day with each setpoint having a specific start and end time. Typically, weekdays are identically programmed and weekend days are individually programmed. Manual override is provided for changing this reference temperature within a given time period.

The present invention finds particular use in a modification to such a programmable thermostat, and a suitable commercially available thermostat incorporating modifications according to the invention is the Saverstat® Model 9710 manufactured by The Coleman Co., Inc.

Figure 1:
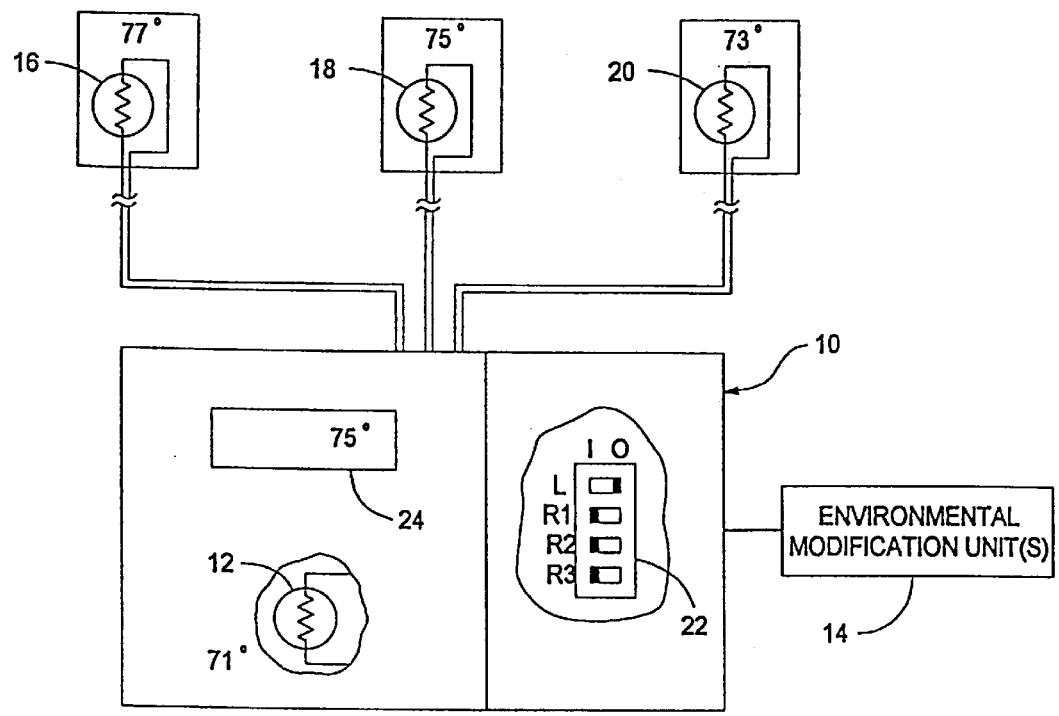
FIG. 1 is a representation of an exemplary environment control system incorporating the subject invention and configured such that the measured temperature is selected to be the average temperature sensed at three remotely placed temperature sensors.

Still referring to FIG. 1, the conditions are assumed that the remote sensor 16 is exposed to 77° F. ambient air, the remote sensor 18 is exposed to 75° F. ambient air and the remote sensor 20 is exposed to 73° F. ambient air. Further, attention is directed to sensor select switch bank 22 (shown in a cutaway of an access door on the cover of thermostat 10) in which it will be seen that switch L (local temperature sensor 12) is "out", switch R1 (remote temperature sensor 16) is "in", switch R2 (remote temperature sensor 18) is "in" and switch R3 (remote temperature sensor 20) is "in". In accordance with the invention and as will be described in detail below, the thermostat 10 averages the temperatures sensed by temperatures switched "in" at switch bank 22 and averages these temperatures for use as the measured temperature processed by the thermostat in accordance with its program to control environmental modification unit(s) 14.

Thus, in the first example shown in FIG. 1, the measured temperature used by the thermostat 10 is: 77°+75°+73° divided by three or 75°. For purposes of illustration and typical of programmable thermostats, this measured value may be displayed on a liquid crystal display 24.

Figure 2:
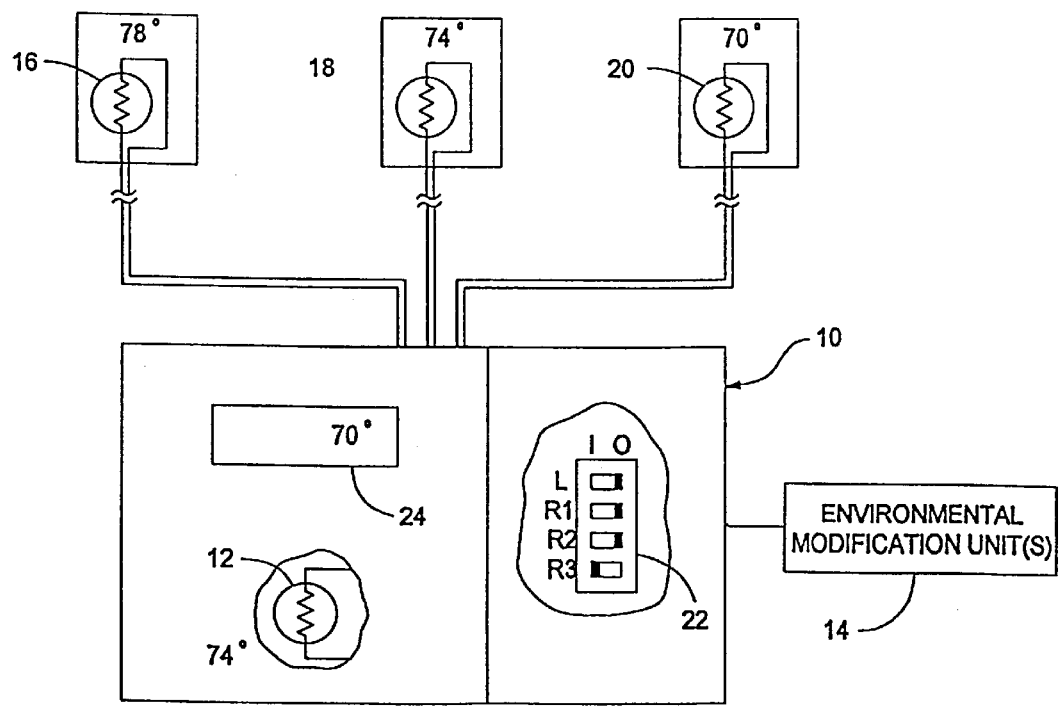
FIG. 2 shows the exemplary system configured such that the measured temperature is selected to be the average temperature sensed at a single remotely placed temperature sensor.

Consider now the same components differently configured as shown in FIG. 2. In this example, the ambient temperature at the thermostat 10 is 74° F. whereas the respective ambient temperatures in the areas of the remote sensors 16, 18, 20 are, respectively, 78°, 74° and 70°. However, only the switch R3 of the switch bank 22 is "in"; therefore the average of the switched in temperature sensors is 70°, and that is the value used for the measured temperature by the thermostat 10 to control the environmental modification unit(s) 14.

Figure 3:
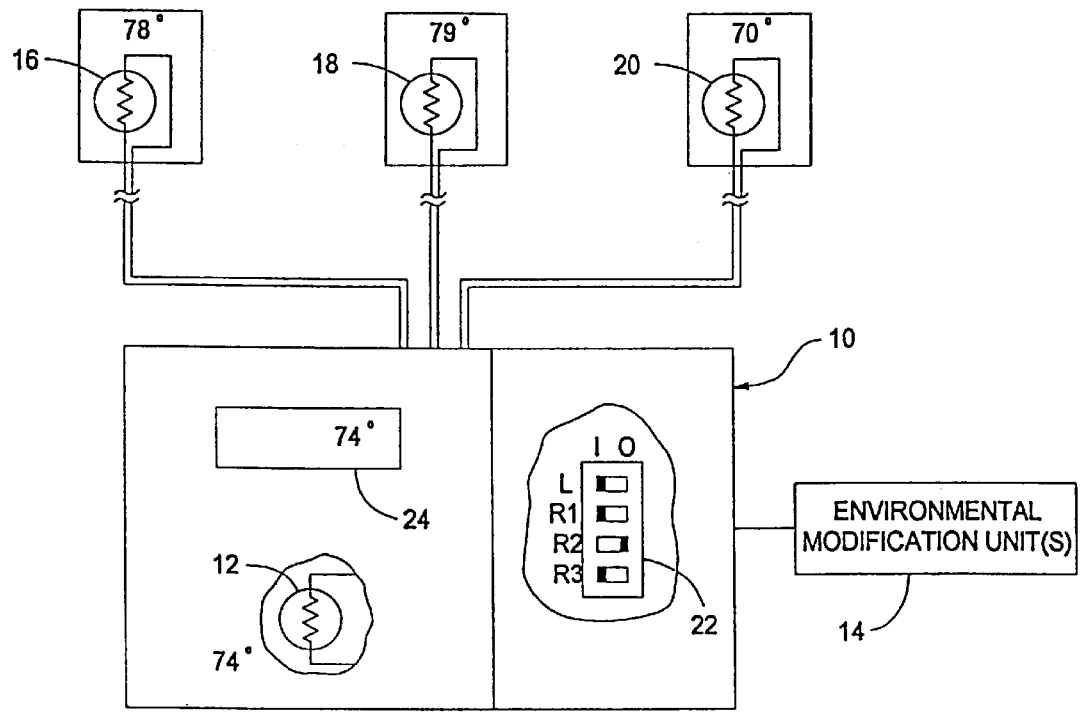
FIG. 3 shows the exemplary system configured such that the measured temperature is selected to be the average temperature sensed at a local temperature sensor and two of three remotely placed temperature sensors.

Another example is shown in FIG. 3 where the ambient temperatures at the local temperature sensor 12 and the remote temperature sensors 16, 18 and 20 are, respectively, 74°, 78°, 79° and 70°. However, only switches L, R1 and R3 of switch bank 22 are switched "in" such that the average temperature of 74° is displayed on the display 24 and used as the current measured temperature.

Figure 4:
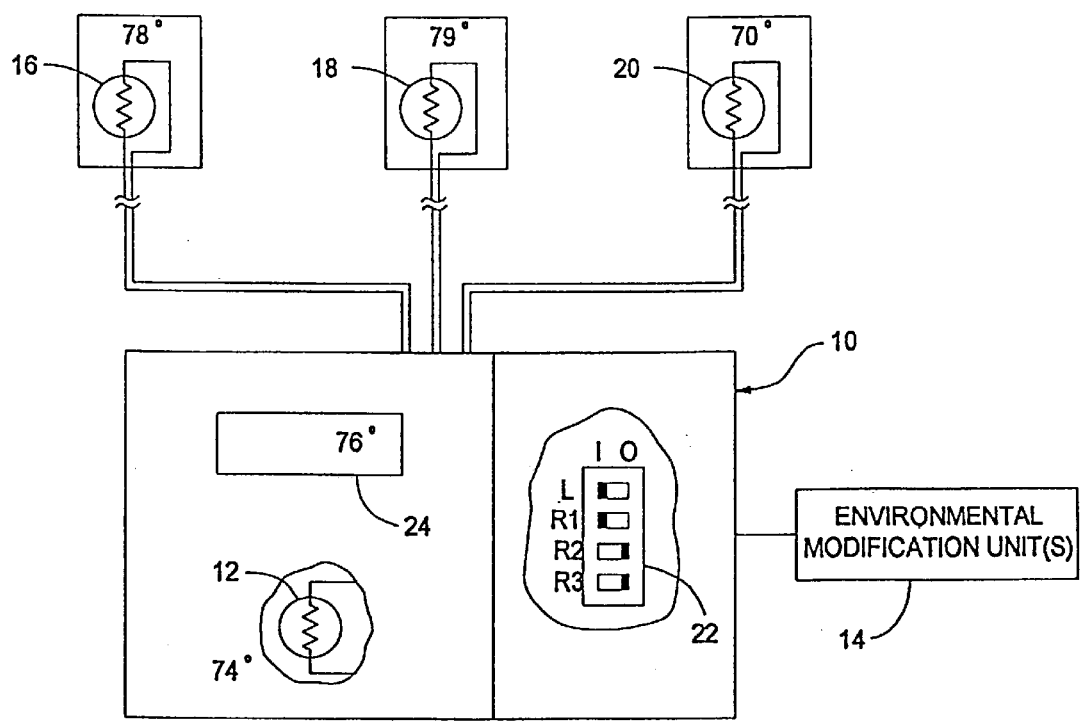
FIG. 4 shows the exemplary system configured such that the measured temperature is selected to be the average temperature sensed at a local temperature sensor and one of three remotely placed temperature sensors.

A final example is shown in FIG. 4 where the ambient temperatures at the local temperature sensor 12 and the remote temperature sensors 16, 18 and 20 are, respectively, 74°, 78°, 79° and 70° as in the immediately previous example. In this example, however, only the switches L and R1 of the switch bank 22 are switched "in" and the resultant measured temperature is therefore 76°.

From the foregoing, it will be appreciated that a given temperature control system incorporating a thermostat employing local and remote temperature sensors and the capability of averaging the sensed ambient temperatures of one or more user selected sensors provides extended flexibility to achieve the most satisfactory and efficient use of the system.

Figure 5:
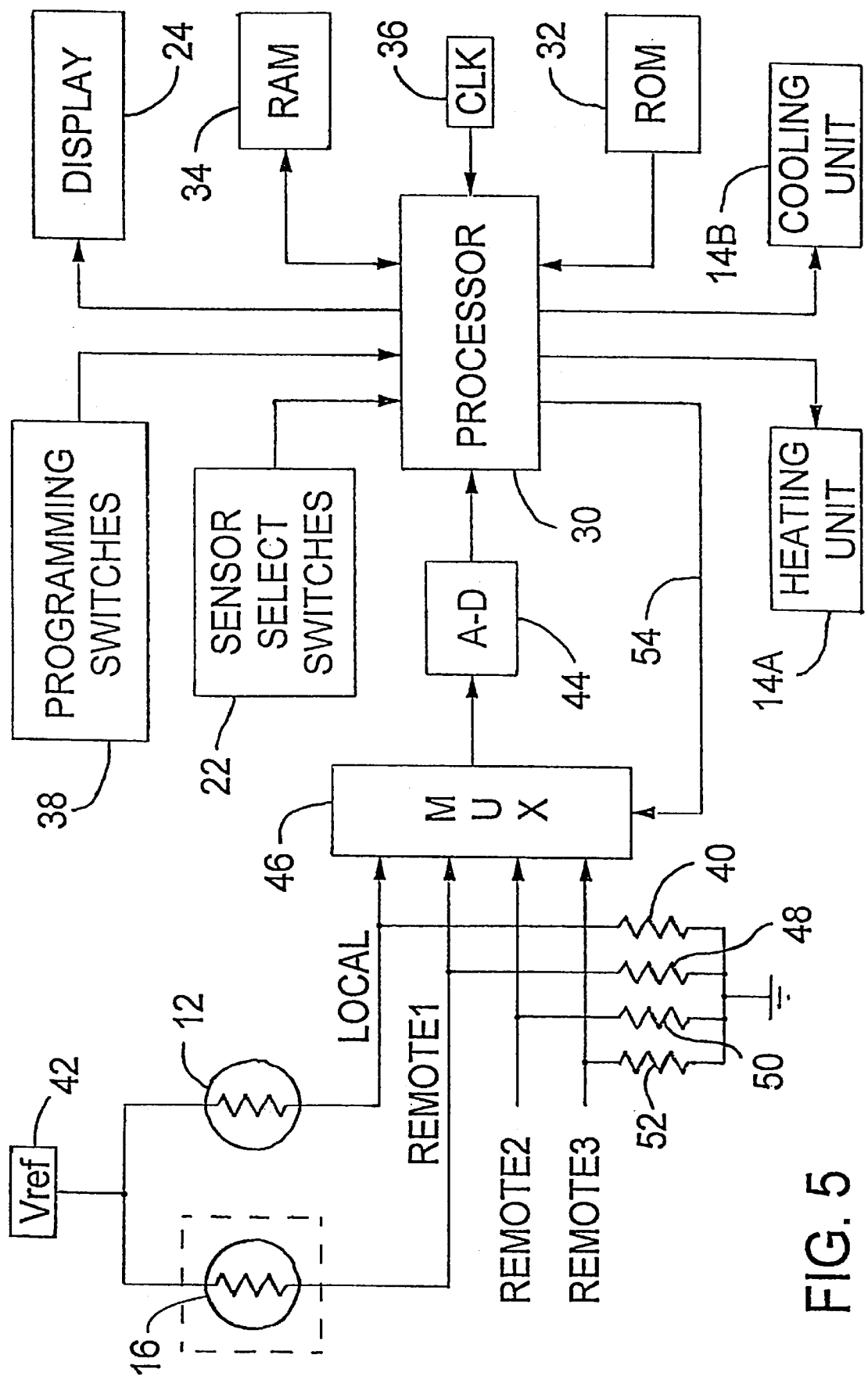
FIG. 5 is a detailed block diagram of a thermostat incorporating the subject invention.

Attention is now directed to FIG. 5 which is a block diagram of a thermostat incorporating the features of the subject invention. As previously mentioned, one presently preferred environment for the invention is a modified seven day programmable thermostat. Such a conventional programmable thermostat includes: a microprocessor 30 which typically includes a read-only-memory (ROM) 32, an oscillator/clock module 36 and an analog-to-digital converter 44 (or equivalent) on one or more integrated circuit chips; a display unit 24; programming switches 38 and a local temperature sensor 12 connected in circuit between a voltage reference source 42 and a voltage dividing resistor 40 which has its other end connected to ground potential. Some conventional thermostats may also include a small random-access-memory (RAM) 34.

In the normal operation of a prior art conventional programmable thermostat, after a program has been entered by a user using the conventional programming switches 38, a "run" mode is entered in which the ambient temperature in the area of the thermostat is repeatedly read and compared against the reference temperature established for the currently applicable time period in order to appropriately activate/deactivate heating unit 14A and/or cooling unit 14B. This operation is conventionally carried out by the processor 30 under control of routines stored in the ROM 32.

Local temperature sensor 12 may be any device which has an electrical characteristic which varies in a known manner with temperature. One well known device which is especially well adapted for this task is a conventional thermistor which has a resistance which varies in a known manner with temperature. For example, one thermistor type has a nominal resistance of about 10,000 ohms at 25° C. (77° F.), and its resistance varies reasonably linearly over a wide temperature range. For the example, both local temperature sensor 12 and exemplary remote temperature sensor 16 are assumed to be suitable thermistors. Thus, it will be understood that the voltage at the junction of local temperature sensor 12 and series resistor 40 is representative of the current ambient temperature in the immediate area of the thermostat. This voltage may be digitized by the analog-to-digital converter and converted to an actual temperature by the processor 30 using a suitable algorithm stored in the ROM 32 or using conventional table look up procedures on tables stored in ROM 32 which relate digital count to a temperature. (Those skilled in the art will appreciate that the latter process may be used to advantage with temperature sensors which do not exhibit a sufficiently linear temperature-to-resistance characteristic.) This calculated or otherwise determined temperature then becomes the measured temperature which is compared to the current reference temperature setpoint and is employed in the user established program by the processor 30 to determine any action command(s) which should be sent to the heating unit 14A and/or cooling unit 14B. The temperature measuring process is carried out periodically, for example, every fifteen seconds, to continuously update the value of the measured temperature.

The present invention incorporates additional circuitry and a revised temperature measurement sub-routine to achieve the selective averaging of one or more temperatures sensed by one or more temperature sensors. The sensor select switch bank 22 provides user input for the selection of which temperature sensors are to be employed in reaching an average measured temperature value as previously described. More particularly, FIG. 5 shows remote temperature sensor R1 16 and provides for not shown, but optional, remote temperature sensors R2 and R3. It will be seen that remote temperature sensor R1 16 is electrically connected between the voltage reference source 42 and voltage dividing resistor 48. Similarly, optional remote temperature sensors R2 and R3, if provided, are connected between the voltage reference source 42 and voltage dividing resistors 50, 52, respectively. Accordingly, the ambient temperature sensed by remote temperature sensor 16, for example, is electrically represented as a voltage appearing at the junction of the sensor 16 and voltage dividing resistor 48.

The voltages appearing at the junctions of the temperature sensors and the resistors 40, 48, 50, 52 are each applied as separate input signals to analog signal multiplexer 46. Analog signal multiplexer 46 has a single output, coupled to the input to analog-to-digital converter 44, and the input signal transferred to the output of the multiplexer is determined from a two-bit address code sent to the multiplexer by processor 30 on lines 54. For example, the address code "00" may select the local temperature sensor input signal for transfer to the analog-to-digital converter 44, code "01" may select temperature sensor R1 16, code "10" may select R2 and code "11" may select R3. A suitable commercially available analog signal multiplexer for performing this operation is a type 74HC4051.

In operation, the processor reads the current state of the sensor select switch bank 22 and determines that switches L and R1 are switched "in" as shown in FIG. 4. Therefore, the temperatures sensed by local temperature sensor 12 and remote temperature sensor R1 16 have been user selected to average for use as the measured temperature in the ongoing control of the environmental control system. During the sequence of the measured temperature determination subroutine, the processor 30 sends the address code "00" to the multiplexer 46 to couple the voltage appearing at the junction between local temperature sensor 12 and voltage dividing resistor 40 to the analog-to-digital converter 30 which conventionally converts the analog voltage to a digital representation of the temperature in the area of the thermostat.

As a practical matter, it is useful to allow time, typically a few milliseconds, for the signal to settle after the multiplexer is switched and then to convert the voltage several times, typically four, to obtain four digital counts. These counts are averaged by the processor 30, and the result is temporarily stored in the RAM 34. Then, the processor sends the address code "01" to the multiplexer 46 to couple the voltage appearing at the junction between the remote temperature sensor 16 and voltage dividing resistor 48 to the output of the multiplexer and to the input to the analog-to-digital converter 44. This voltage is representative of the temperature in the area of the remote temperature sensor 16. Again, after the signal settles, the conversion is repeated several times, averaged and the result is sent to the RAM 34 for temporary storage.

The two values stored in RAM 64 are then accessed by the processor and averaged, and the resultant average count is converted to a measured temperature value by the use of a conventional conversion algorithm or look up table as may be appropriate for the temperature sensor type in use in the system. The resultant measured value is used in the conventional fashion by comparing it to the reference temperature programmed for the current time period and taking into account hysteresis and anticipator values as previously described. The measured temperature is then displayed on the display unit 24, rounded off to the nearest degree.

This process is repeated periodically, preferably several times a minute, typically every fifteen seconds, to continuously update the averaged measured temperature. On the next measuring cycle, the processor would again send the address code "00" to the multiplexer, followed by the code "01"; i.e., the address codes "10" and "11" are not used because the corresponding sensors are switched out by the positions of the switches R2 and R3 in the sensor select switch bank 22 as shown in FIG. 4.

In order to assure against brief perturbations which could cause inappropriate control signals to be sent to the heating unit 14A and/or the air conditioning unit 14B, the following conventions may be followed: a) the measured temperature may increment only if the three immediately previous averaged sensed temperature readings are higher than the established measured temperature, and b) the measured temperature may decrement only if the three immediately previous averaged sensed temperature readings are lower than the established measured temperature.

It will be understood that the temperature measuring routine will be suitably altered according to the setting of the switches in the sensor select switch bank 22. For example, if the switches were set as shown in FIG. 1, the temperatures ambient to the three remote temperature sensors R1 16, R2 18 and R3 20 would be averaged to obtain the measured temperature value. In that event, the successive address codes sent to the multiplexer 46 by the processor 30 are "01", "10" and "11", the code "00" being bypassed to lock out the measurement of the temperature at the local temperature sensor 12 and to preclude its use in the temperature averaging process.

The remote temperature sensors 16, 18, 20 are preferably individually disposed within a protective housing to facilitate installation and to provide long term protection. A suitable commercially available remote housing incorporating a thermistor integral temperature sensor is Model 9015, manufactured by The Coleman Co., Inc.

While convenient and versatile, the provision of the switches L, R1, R2 and R3 in the sensor select switch bank 22 need not necessarily be included in a simple version of the invention. For example, a configuration in which a local and a single remote temperature will always be averaged can be hard wired or otherwise implemented such that the multiplexer always alternately transfers the voltages representative of the temperatures sensed at the two temperature sensors to the analog-to-digital converter for processing. Accordingly, the need for the sensor select switch bank 22 is eliminated in the simplified system.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A thermostat for controlling an environmental modification unit in accordance with differences between a reference temperature and a measured temperature comprising:

A) setpoint means for establishing the reference temperature;

B) at least two temperature sensors, at least one of which temperature sensors is remotely positioned with respect to said thermostat and one temperature sensor which is integral with the thermostat;

C) sensor select switch means for selecting which temperature sensors are used by said averaging means to obtain the average measured temperature;

D) processing means for developing an average measured temperature and for comparing the averaged measured temperature to a current reference temperature to generate control signals based on the difference therebetween for selectively controlling the environmental modification unit, said processing means including:

1) a processor;

2) program entry means coupled to said processor for establishing the current reference temperature;

3) analog switch means for selectively coupling voltages representative of the ambient temperatures sensed only by temperature sensors selected by said sensor select switch means to said processing means; and 4) an analog-to-digital converter coupled to periodically receive voltages representative of temperatures measured by the temperature sensors selected by said sensor select switch means from said analog switch means, said analog-to-digital converter converting each voltage applied thereto to a digital count and providing the digital count to said processor for use in developing the averaged measured temperature;

E) said processor summing said digital counts received during each period to obtain a total digital count and dividing the total digital count by the number of temperature sensors selected by said sensor select switch means to establish an average digital count representative of the average measured temperature which is compared to the digital value representative of the reference temperature to determine the difference therebetween.

2. The thermostat of claim 1 which includes a plurality of said temperature sensors differently remotely positioned with respect to said thermostat and to one another.

3. The thermostat of claim 1 in which said processing means samples the voltage representative of the temperature of each of the temperature sensors selected by said sensor select switch means a plurality of times during each period and averages the plurality of samples to obtain the digital count accordingly attributed to each temperature sensor for the period.

4. The thermostat of claim 2 in which said processing means samples the voltage representative of the temperature of each of the temperature sensors selected by said sensor select switch means a plurality of times during each period and averages the plurality of samples to obtain the digital count accordingly attributed to each temperature sensor for the period.

* * * * *